United States Patent

Baratuci et al.

[11] Patent Number: 5,851,609
[45] Date of Patent: Dec. 22, 1998

[54] PREFORMED FLEXIBLE LAMINATE

[75] Inventors: James Lynn Baratuci, Stow; Ronald Ellsworth Buchanan, Broadview Heights; Louis Anthony Ferri, Brecksville; Lanny Dean Ritz, Tallmadge, all of Ohio

[73] Assignee: TruSeal Technologies, Inc., Beachwood, Ohio

[21] Appl. No.: 607,896

[22] Filed: Feb. 27, 1996

[51] Int. Cl.[6] .............................. B29C 45/14; B32B 1/04; E06B 3/24
[52] U.S. Cl. ............................................ 428/34; 52/786.13
[58] Field of Search ................................... 428/34, 68, 76, 428/182; 52/172, 786.13, 786.1; 156/107, 109; 49/479, 486, 488, 495; 264/129, 135, 176.1, 177.17, 210.1, 252, 261

[56] References Cited

U.S. PATENT DOCUMENTS

| | | |
|---|---|---|
| 2,045,849 | 6/1936 | Genter . |
| 2,271,180 | 1/1942 | Brugger . |
| 2,275,812 | 3/1942 | Woelfel . |
| 2,943,965 | 7/1960 | Stogre . |
| 3,041,223 | 6/1962 | Sage . |
| 3,097,061 | 7/1963 | Woelk . |
| 3,758,996 | 9/1973 | Bowser . |
| 3,791,910 | 2/1974 | Bowser . |
| 4,109,432 | 8/1978 | Pilz . |
| 4,113,905 | 9/1978 | Kessler . |
| 4,141,186 | 2/1979 | Schoofs . |
| 4,205,104 | 5/1980 | Chenel . |
| 4,226,063 | 10/1980 | Chenel . |
| 4,268,553 | 5/1981 | Marzouki et al. . |
| 4,422,280 | 12/1983 | Mertin et al. . |
| 4,429,509 | 2/1984 | Vachet et al. . |
| 4,431,691 | 2/1984 | Greenlee . |
| 4,476,169 | 10/1984 | Nishino et al. . |
| 4,579,756 | 4/1986 | Edgel . |
| 4,622,249 | 11/1986 | Bowser . |
| 4,745,711 | 5/1988 | Box . |
| 4,783,356 | 11/1988 | Kugelmann, Sr. . |
| 4,807,419 | 2/1989 | Hodek et al. . |
| 4,831,799 | 5/1989 | Glover et al. . |
| 4,835,130 | 5/1989 | Box . |
| 4,950,344 | 8/1990 | Glover et al. . |
| 4,951,927 | 8/1990 | Johnston et al. . |
| 4,994,309 | 2/1991 | Reichert et al. . |

(List continued on next page.)

FOREIGN PATENT DOCUMENTS 0 500483 A1   8/1992   European Pat. Off. .

OTHER PUBLICATIONS

CAN/CGSB–12.8–M90 published Apr. 1990 by Canadian General Standards Board, Ottawa Canada.

*Primary Examiner*—Donald Loney
*Attorney, Agent, or Firm*—Samuel B. Laferty; Hudak & Shunk Co., LPA

[57] ABSTRACT

A composite structure comprising a preformed flexible laminate in adhering contact with at least a first and second transparent or translucent panel members such as would be useful as an insulated glass unit. The flexible laminate contains an undulating spacer element either partially or totally embedded within a core material and has a polymeric coating on at least one surface thereof. The flexible laminate effectively seals the interior of the panel structure from air and/or moisture and maintains a desired distance between the panels. A multi-cavity extrusion die for forming the preformed flexible laminate has a core cavity for receiving the core material as well as the undulating continuous spacer element. Converging walls within the core cavity serve to embed at least one side of the spacer element in the core material and a land area forms a desired shape or configuration wherein the spacer element undulation is maintained. At least one polymeric feed cavity located downstream from said core cavity and said land area applies a polymeric film or coating to at least a surface of the embedded spacer element. A plurality of optional feed cavities can apply the same or different polymers to additional surfaces of the embedded spacer element and can totally cover or encapsulate the same.

26 Claims, 6 Drawing Sheets

U.S. PATENT DOCUMENTS

| | | |
|---|---|---|
| 5,150,881 | 9/1992 | McKavanagh . |
| 5,177,916 | 1/1993 | Misera et al. . |
| 5,270,091 | 12/1993 | Reichert et al. . |
| 5,286,537 | 2/1994 | Oita et al. . |
| 5,290,611 | 3/1994 | Taylor . |
| 5,295,292 | 3/1994 | Leopold . |
| 5,313,761 | 5/1994 | Leopold . |
| 5,436,040 | 7/1995 | Lafond . |
| 5,439,716 | 8/1995 | Larsen . |
| 5,441,779 | 8/1995 | Lafond . |
| 5,447,761 | 9/1995 | Lafond . |
| 5,487,937 | 1/1996 | Newby . |
| 5,491,953 | 2/1996 | Lafond . |

PREFORMED FLEXIBLE LAMINATE

FIELD OF INVENTION

The present invention relates to a composite structure containing a preformed flexible laminate advantageously used between at least two transparent or translucent panel members. The preformed flexible laminate can serve to adhere the panels, space the panels, as well as to seal off a gas space between the panels. More specifically, the preformed laminate contains an undulating spacer element therein, a core material partially or totally embedding the spacer element and at least one polymeric film different than the core material which coats at least a surface of the core material.

The present invention further relates to a multi-cavity extrusion die for forming the flexible laminate wherein in a core cavity having a converging wall and a downstream land the core material is applied to a spacer element without disfiguring the same. The die also sequentially applies at least one or more polymeric materials which can be the same as or different than the core material whereby the configuration of the undulating spacer element and the core material is maintained.

BACKGROUND OF THE INVENTION

Multiple pane windows (thermally insulating) are desirable because they reduce the heat and/or cooling loss therethrough. The spacer-sealant strip used in multiple pane windows has several functions. Structurally it can serve as a spacer (preventing multiple panes from approaching each other) and as an adhesive (keeping the panes from separating). The strip also can seal the inner gas space between the panes and often desiccates the gas space so that the dew point of the inner gas is not reached (resulting in condensed water on the pane) when exposed to cold temperatures.

Visco-elastic sealants have been observed to deform to allow the multiple pane assemblies some relative movement. Relative movement is beneficial when one or more panes take a physical impact or thermally expands or shrinks to a different extent than the one or more other panes.

A variety of spacer sealant strips have been developed. Extruded rectangular cross-sectional tubing filled with a desiccant that faces the inner gas space has been popular in combination with a sealant to seal and/or adhere the multiple panes to the rigid plastic or metal rectangular cross-sectional tubing. The extruded tubing generally has to be cut and spliced at the corners. Such splices are generally weak spots in the seal. Further, separate spacers and sealers increase the complexity and difficulty of accurately positioning the spacer and/or sealant at the inner periphery of the fragile glass panes.

A unitary spacer/sealant is described in U.S. Pat. No. 4,431,691. It used a spacer strip embedded in a ribbon of deformable sealant. The spacer strip and sealant can be bent around corners without a splice joint.

SUMMARY OF THE INVENTION

A unitary seal (flexible laminate) is utilized in a multi-pane window composite to define the spacing between two panes, to adhere said two panes, and to seal and desiccate the insulating gas space between said at least two panes. An additional pane(s) and unitary seal(s) can be used to make a multi-pane window with three or more panes. The unitary seal comprises a longitudinal spacing element (desirably undulating with a metal moisture barrier), a core material, and at least one adhesive material or film adhering said core material to said at least two panes. The core material is desirably compositionally different than the adhesive material or film. The spacing element can bend to conform to the periphery of the two panes without forming discontinuities in the spacing element.

A multi-cavity extrusion die is utilized to partially or totally embed an undulating spacer element in a core material and to apply at least one adhesive material or film to a surface of the core material. The die contains a core cavity and an extrusion aperture for receiving the undulating spacer element as well as the core material. The convergence angle of the core cavity is important as is the land length of the extrusion aperture in order to prevent the spacer element (desirably undulating) from being crushed or flattened and the formed core material extrudate from ballooning or changing its shape after egressing from the core extrusion aperture. Subsequent to the application of the core material, one or more polymeric feed cavities generally apply polymeric material (e.g., adhesive film) to one or more surfaces of the core material. A downstream coating aperture having a desired land length forms the final shape of the flexible laminate and yet maintains the shape of the spacer element. The plurality of polymer feed cavities are separate from one another but can be fed from a single distribution block which in turn can be supplied by a single source. Alternatively, each polymer feed cavity can be supplied by a different polymer material.

BRIEF DESCRIPTION OF DRAWINGS

In FIG. 1 the spacer element (310) is partially embedded in the left side of the core material (320). Adhesive film (330) is applied to three sides of the seal (300);

FIG. 2 is similar except the spacer element (410) is more nearly centered in the seal (400);

FIG. 3 is similar to FIG. 2 except a new surface layer (540) which can be a sight line cover or barrier film is present;

FIG. 4 is similar to FIG. 2 except the adhesive films (630a) and (630b) are two separate films rather than the continuous film (430) of FIG. 2;

FIG. 5 is similar to FIG. 2 except an additional core material (740) besides core material (720) is present;

In FIGS. 1–6, 8 and 9, the seals are numbered in even increments of 100, the spacer is 210, 310, 410, etc., the core as 220, 320, 420, etc., the adhesive film as 230, 330, 430, etc., an additional film is 540, and an additional separate core material is 740.

FIG. 20 comprises FIGS. 20A, 20B, and 20C, which are plan views of outer land inserts, and FIG. 21 comprises FIGS. 21A, 21B, 21C, which are plan views of other land inserts.

DETAILED DESCRIPTION OF THE INVENTION

An improved preformed flexible laminate or unitary spacer-sealant strip 200, 300, 400, etc., is disclosed comprised of a spacing element 210, 310, 410, etc., a core material 220, 320, 420, etc., comprising one or more polymeric materials, and polymeric adhesive material(s) or film(s) 230, 330, 430, etc., that bonds to the one or more panes 22, 23 of a multi-pane insulating unit. The core material(s) is desirably compositionally different than the adhesive film(s). The adhesive film(s) is individually formulated to optimize its characteristics while the core material is separately optimized for a different set of characteristics, e.g., modulus, tensile strength, desiccating ability thermal conductivity, and moisture vapor transmission rate (MVT). The core material may optionally be one or more different polymeric materials (e.g., including a prefoamed polymeric material and/or a preshaped non-foam polymeric material) to give certain physical properties. Polymers are defined for the purpose of this specification to be species with number average molecular weight above 10,000. Lower molecular weight species will be identified as oils, tackifiers, and chemical compounds.

Industrial standards and test methods exist to rate and evaluate the ability of sealed insulating glass units to withstand temperature changes, pressure changes and ultraviolet light exposure while maintaining seal integrity and avoiding volatiles that may chemically fog the inner glass surfaces. National Standard of Canada CAN/CGSB-12.8-M90 is a useful standard with test methods, as compliance with the tests therein are indicative of the ability to pass similar standards in other countries. In CAN/CGSB-12.8-M90§3.6.3 Volatile Fogging the presence of U.V. degradable organic materials is undesirable because if the organics form a film one or two molecules thick on the glass member contacting the cooling plate, they may cause failure to meet this standard. In §3.6.4, Dew Point after Weather Cycling and §3.6.5, Dew Point after High Humidity Cycling the presence of tackifiers which often are volatile and U.V. degradable materials enhance performance. In both Dew Points after cycling tests, the temperature cycling results in compressive and tensile forces on the seal as the gas in the sealed space tries to expand and contract.

In this disclosure the ability to form a coherent unitary seal from two or more different compositions allows the adhesive material or film(s) to have higher concentrations of tackifiers and/or adhesion promoting species (e.g., silanes) while the core material(s) can be separately optimized for modulus, low volatiles, low density etc. to allow the unitary seal to meet more demanding tests.

The unitary spacer/sealant strip is a laminate of at least three materials. It differs from other strips in insulating glass units in that the spacer (solid), core (at least one visco-elastic material) and adhesive material or film, (at least one visco-elastic material) are merged into the unitary spacer-sealant within a multiple cavity extrusion die described herein below. The unitary seal desirably has width and thickness from about 0.1 to about 1.25 inch and more desirably from about 0.2 to about 1.00 inch. It may also be referred to as a tape. The width direction typically spans between the two panel members. The tape desirably has at least two opposing tacky surfaces so the tape can be adhered to one and eventually both panel members. Prior to application in a panel, the tape may have one or more removable film(s) over the tacky surfaces to prevent self-adhesion of the tape during shipping. The integral spacer element deforms to conform to the periphery of panels without changing its width a significant amount.

The unitary seal differs from seals in construction, motors, hydraulics, etc., in that the unitary seal has from about 5 to about 50 wt. percent desiccants, more desirably from about 8 to about 15 weight percent based on the weight of the unitary seal.

The method of manufacturing the spacer/sealant of the present invention avoids many anticipated problems with a laminate formed from visco-elastic materials (e.g., polymers or polymeric streams). For example, the cross-sectional uniformity of a laminate made by assembling several polymeric streams (shaped or unshaped) outside of a die would be hard to control. The pressures applied to cohesively bond the different streams would inherently need to be lower than the deformation pressure of the most compliant polymeric stream. Further, the tackiness of the polymeric streams (desirable for forming a coherent unitary spacer/sealant) would be anticipated to cause adhesion of the strip to the shaping/laminating equipment.

The core material comprises at least one composition, adhered together if multiple compositions. The core material desirably is compositionally different than the adhesive film and the spacer. Desirably, the core material(s) is from about 50 to about 99 volume percent of the unitary sealant and more desirably from about 60 to about 98 volume percent of the unitary sealant. Hereafter, when referring to the composition of multiple films or multiple core materials, the values compared will be weight average values for all core materials or all adhesive film materials unless a single material is used.

On average, the core material(s) has more filler on a weight percent basis than the adhesive film. Desirably, the core material(s) has from about 25 to about 85 wt. % filler and more desirably from about 40 to 75 wt. % based on the weight of said core material(s). Desirably, the adhesive material or film(s) has from about 5 to about 50 wt. % filler and more desirably from about 10 to about 35 wt. % based upon the weight of said adhesive film(s). As fillers may reduce adhesion they are desirably present in lower concentration in the adhesive film(s). Fillers can modify the rheology of the polymer compositions and provide U.V. protection. Desirably, the core material(s) has on average at least 5 or 10 wt. % and more desirably at least 20 wt. % more filler than the adhesive film.

Desirably, the adhesive film has more tackifier on a weight percent basis than the core material on average.

Desirably the adhesive film(s) has from about 2 to about 50 wt. % tackifier (e.g. resin) and more desirably from about 5 or 10 to about 40 wt. % based upon the total weight of the adhesive film(s). Desirably the core material(s) has less than 20 and more desirably less than 15 wt. % tackifier based upon the total weight of the core material(s). More desirably, on average, the adhesive film has at least 2, 5, or 10 wt. % more tackifiers than the core material, and preferably at least 15 or 20 wt. % more tackifier than the core material (s). The amount of desiccant and glass adhesion promoter on average weight percent basis in the core and adhesive film are also desirably different as set forth below.

The desiccant is used to dry the inner gas space to below the dew points specified. The desiccant(s) is desirably present in greater weight percentages on average in the core material than the adhesive film. Desiccants may be used in amounts from about 5 to about 50 wt. %, more desirably from about 8 or 10 to about 50 wt. % in the core material(s). Desiccants may be present from about 0 to about 12 wt. %, more desirably from about 0 to about 8 wt. % in the adhesive film(s). Desirably, the weight percent desiccant(s) concentration in the core material(s) is at least 2, 5 or 10 wt. % higher than in the adhesive film(s) and more desirably at least 15 wt. % higher. As the desiccant will be used to dry the inner gas space, desirably at least a portion (e.g., at least 20, 30, 40, 50, or 60 volume percent) of the core material is located between the inner gas space and the at least one longitudinal spacer element of the insulated unit. The unitary seal is desirably designed so at least said portion of the core material will be so located. Molecular sieve is a preferred desiccant. Other desiccants include other zeolites, silica gels, calcium oxide, calcium sulfate and activated alumina.

The adhesive film(s) desirably has more glass adhesion promoters on a weight percent basis (e.g., silanes such as vinyltriethoxysilane) than the core material and less desiccant and fillers than the core material(s). The adhesive film(s) desirably has on average from about 0.25 to about 2 wt. % of a silanes (e.g. coupling agent(s)) and more desirably from about 0.5 to about 1.5 wt. %. The core material(s) desirably have less than 1 wt. % silanes and more desirably less than 0.75 wt. %. Desirably the weight percent silane in the adhesive film(s) is at least 0.25 wt. % and more desirably 0.5 wt. % higher than in the core material(s).

The core material comprises at least one composition, adhered together if multiple compositions, that is deformable so that during assembly of the multi-pane insulating unit the width of the unitary sealant (perpendicular to the panels) can be compressed to about the width of the spacer element while forming a coherent seal near the periphery of the panels. A portion of the core material may be a preformed foam (e.g., polymeric foam such as a urethane foam or foamed polymers such as poly(vinyl chloride), high or low density polyethylene, rubber modified polystyrene, or polystyrene modified with polyethylene. The remainder of the core and often all of the core is a compounded substantially amorphous polymer. Although isobutylene based polymers such as polyisobutylene and butyl rubber are preferred due to their low MVT, other polymers may be used instead of or in addition to isobutylene based polymers. Isobutylene-based polymers will be defined as polymers comprising at least 80 mole percent repeat units from isobutylene. Examples of other polymers include ethylene-propylene polymer, ethylene-propylene diene polymer (EPDM), ethylene-vinyl acetate, acrylic rubber, neoprene rubber, chlorosulfonated polyethylene, urethane, epoxy, natural rubber, polymer from conjugated dienes such as synthetic polyisoprene polybutadiene, nitrile rubber, or styrenebutadiene rubber, and amorphous polyolefins (e.g., homopolymer or copolymer of propene along with other monoolefins or diolefins having from 2 to 10 carbon atoms and having less than 20 wt. % crystallinity as polymers and being other than EPDM and ethylene-propylene polymer). Polyisobutylenes desirably have a number average molecular weight of about 2,000 to 1,400,000 or more, and more desirably from 10,000 to 500,000. The polyisobutylenes are desirably polymers of essentially isobutylene with initiator fragments and/or chain transfer or chain terminator fragments. Butyl rubber is a polymer comprising from about 80 to about 98 or 99 wt. % isobutylene and from about 1 to about 20 wt. % of other monomers such as dienes with from 4 to 12 carbon atoms (e.g., isoprene), and/or aromatic vinyl monomers with from 8 to 16 carbon atoms such as styrene, para-methylstyrene, etc. If para-methylstyrene is a comonomer, desirably the polymer is halogenated (e.g., brominated). Butyl rubber desirably has a number average molecular weight from about 250,000 to about 600,000, more desirably from about 350,000 to about 450,000. The other polymers desirably have number average molecular weights from about 10,000 to 1,000,000 or 2,000,000. Amorphous polyalphaolefins desirably have a number average molecular weight from about 10,000 to about 40,000, more desirably from about 10,000 to about 25,000. If butyl rubber is present in the core, it is desirably from about 5 to about 70 wt.% of the polymers of the core. Amorphous polyalphaolefins are often used in combination with polyisobutylene and/or butyl rubber. The weight ratio of amorphous polyalphaolefins to polyisobutylene and/or butyl rubber is desirably from 1:8 to 8:1 and more desirably from 1:4 to 4:1.

Optionally, the core can include thermoplastic elastomers such as block copolymers of styrene-butadiene such as Kraton™ or thermoplastic elastomers made by dynamic vulcanization of one or more rubbers while dispersed in one or more thermoplastic polymers. These are available from Advanced Elastomer Systems in Akron, Ohio. Materials low in thermal conductivity such as foams may be used in the core to lower the overall thermal conductivity of the unitary seal. It is desirable to have low thermal conductivity in the unitary seal. It is desirable that the thermal conductivity of the core material(s) be at least 10 percent, more desirably at least 20, 30, or 50 percent lower than the adhesive film(s). It can be measured by ASTM C177-85.

The polymer(s) of the core material(s) and adhesive material(s) or film(s) will have a glass transition temperature (Tg). The Tg is the temperature where the polymer goes from being glassy to a rubbery state. It can be measured by differential scanning calorimetry and/or dynamic mechanical analysis. Compatible polymers and organic compounds (hydrocarbon resins) can shift the Tg of a polymer when blended therein. The modulus of a polymer decreases as it goes from glassy to a rubbery state. It is desirable in this application that the glass transition temperature (i.e., the primary glass transition, the one associated with at least 50 volume percent of the polymer) be different by at least 5°, 10°, or 20° C. between the core material(s) and the adhesive film(s). The Tg can be higher in either the adhesive film(s) or the core materials(s). The Tg of the adhesive film is desirably from about 20° C. to about −60° C., and more desirably from about 0° C. to about −30° C. The Tg of the core material(s) is desirably from about 100° C. to about −60° C. and more desirably from about 60° C. to about −30° C.

A preferred composition for the core material(s) is from about 5 to about 15 wt. % isobutylene based polymers, from about 5 to about 15 wt. % amorphous polyalphaolefin, from about 5 to about 15 wt. % hydrocarbon resin, from about 25 to about 75 wt. % carbon black or other fillers, and from about 10 to about 30 wt. % plasticizer.

Compounding components in the core material and adhesive film include fillers, antioxidants, hydrocarbon resins, antiozonants, plasticizers, tackifiers (e.g., tackifier resins), glass adhesion promoters, desiccants, etc. Carbon black is a preferred filler as it has some reinforcing effect and is very effective at protecting the polymers of the seal from ultraviolet (UV) radiation. Talc, $TiO_2$, and hollow glass spheres are other preferred fillers. Hollow glass spheres would be anticipated to lower the density and thermal conductivity of the unitary seal.

As volatile materials may condense on the surfaces of the panels resulting in a chemical fog or condensate (fogging), it is desirable that the compounding components are low in volatility or if volatile or volatilizable components are used they are positioned in the unitary seal away from the inner gas space to minimize the chance of fogging. Volatile tackifiers and glass adhesion agents are desirably in lesser concentrations in the core and in greater concentrations in the adhesive material or film. The film by alternate unitary seal designs may have limited exposure to the inner gas space.

The primary function of the adhesive material or film is adhering and the secondary function is acting as a moisture vapor barrier at the interface between the spacer and the transparent or translucent panels. A preferred composition for an adhesive film(s) is from about 15 to about 30 wt. % isobutylene based polymer, from about 15 to about 30 wt. % hydrocarbon rubber, from about 15 to about 25 wt. % plasticizer, from about 15 to about 35 wt. % carbon black or other fillers, and optionally a silane adhesion promoter.

The adhesive material or film (e.g., coating) of the unitary seal can be present on 1) just portions of the core surface sufficient to adhere the first and second panel member (panes), 2) the entire surfaces contacting the first and second panel members, or 3) partially or completely encasing the core material (as shown in the figures). Thus, the adhesive material or film is at least one film and in some preferred embodiments, at least two films compositionally the same or different ( e.g., with one contacting the first panel member and another contacting the second panel member) The adhesive material or film is generally a pumpable compounded polymer composition during manufacture of the unitary seal. For some applications it may be desirable that both the adhesive film(s) and core material(s) are curable. Curable is defined for these purposes as a chemical linking of polymers that results in an increase in tensile modulus of at least 5, 10, or 15 percent after curing.

The polymers of said adhesive material or film are the same polymers as set forth for the core material. Desirably, the polymers are used in different percentages in the core as compared to the adhesive film. Preferably isobutylene based polymers are present in weight percentages desirably of at least 20 or 25, more desirably at least 50, and preferably at least 90 of the total polymers of said adhesive film.

The adhesive film desirably can be from about 0.001 inch (25 μm) thick to about 50 volume percent of said unitary seal more desirably from about 1 or 2 to about 40 volume percent. More desirably, the adhesive film is from about 0.002 inch to about 0.200 inch (0.051 mm–5.08 mm) and preferably from about 0.010 to about 0.100 inch thick (0.254 mm to 2.54 mm). At least one adhesive film from said unitary seal needs to be in contact with the first panel member and the same or another adhesive film of said unitary structure needs to be in contact with the second panel of the insulated unit. Due to the method (co-extrusion) of forming the adhesive film, the adhesive film may vary slightly in thickness when the unitary seal is cut cross-sectionally.

Desirably, the adhesive film remains uncrosslinked in the insulated unit, but optionally a portion or all of the adhesive film is crosslinked or cured under conditions where the core material is not cured. A preference against crosslinking is due to volatiles generated during crosslinking which may cause a chemical fog or condensate on the panels during service (fogging) as in §3.6.3 of CAN/CGSB-12.8. If the volatiles could be avoided or isolated from the inner gas space, the preference would be diminished. The polymeric film can be comprised of two or more adhesive films even to the extent of two adjacent parallel compositionally varied films adhered to the same first or second panel.

A decorative facing (sight line layer) can be applied during extrusion of the unitary seal or subsequent to formation of the unitary seal. Decorative facing is more often used on the inner surface of the unitary seal adjacent the sealed gas space (i.e., parallel to the spacer element). The facing may be used on the backside of the unitary seal (180° away). This facing if on the inner surface of the seal is often visible from the inside of the assembled window and may be used to change the color or appearance of the unitary seal. If the facing is applied subsequent to extruding the seal, then the facing is defined for the purpose as not a portion of the unitary seal. If the facing is coextruded and is compositionally equivalent to and continuous with the adhesive film, it will be defined as part of the adhesive film(s). Otherwise, it will be defined as part of the core material.

A barrier film can be present in the same inner surface of the unitary seal as set forth for the decorative facing. If the barrier film has an appropriate color it can function both as a barrier film and decorative facing. A barrier film desirably inhibits the diffusion of volatile or volatilized chemical compounds from the unitary seal into the sealed space between the two panel members in the CAN/CGSB12.8-M90§3.6.3. Volatile Fogging Test. To achieve this result the barrier film should be substantially continuous between the two panel members (extend to and contact both panel members) and extend around the entire periphery of the sealed space. Further compositionally the barrier film should have low amounts of volatile chemicals or compounds that produce volatiles when exposed to U.V. radiation. The low amount is lower than the average concentrations in or produced by the adhesive film(s) and/or core material(s). If a filler is used desirably it is a platy filler like talc with barrier properties. Desirably, the polymers which constitute at least 20 or 25 weight percent, more desirably at least 50 weight percent, and preferably at least 90 weight percent of said barrier film are butyl rubber, or polyisobutylene, or EPDM rubber or other amorphous polyolefins or combinations thereof. Compositionally the barrier film will be more like the core material(s).

The spacer element desirably is capable of resisting normal compressive forces exerted in at least one plane normal to a plane in which the longitudinal areas of the spacer lies (e.g., forces perpendicular to the planes formed by said panel members) and generally determines the minimum separation distance between a first and second panel member and blocks moisture vapor transmission (MVT) through a substantial portion (majority) of the unitary seal. The core and/or adhesive film generally extend beyond the spacer in said one plane in a sufficient amount that when compression is applied, the adhesive film and optionally said core material is deformed slightly to establish a continuous sealing interface with said two panels but not deforming (due to the spacer and visco-elastic properties of the other components) to result in detrimental deformation of the shape of said unitary seal. It is anticipated that in most situations the visco-elastic nature of the adhesive film and core material result in a space between the ends of the spacer element and each panel of from about 0.001 inch to about 0.03 inch. Desirably about 0.01 inch will exist due to trapped visco-elastic material near the top and bottom of the spacer element.

A metal spacer element generally has lower moisture vapor transmission rate (MVT) than a plastic one. The width of the spacer element is measured perpendicular to the panel members. The spacer element has its maximum rigidity in the width direction. Transverse to the height direction, the spacer is relatively flexible, allowing it to bend to conform to the periphery of the panel members. The preferred spacer element can be bent transverse (perpendicular) to its width in an angle such as from 1° or 2°–150° without changing the width of the spacer element more than a tenth of one percent and only deforming a wall of the spacer element. One preferred spacer element is a strip of plastic, metal or cured rubber or a laminate of plastic and metal or paper (cellulosic) and metal or cured rubber and metal. Spacer elements undulating (e.g., sinusoidally) along their length are desirable for added rigidity. Incorporated by reference herein are the teachings of U.S. Pat. No. 4,431,691 with respect to a bendable spacer strip and its interaction with deformable sealant and composite structures.

The spacer element can be from about 0.1 to about 10 % of the volume of the unitary seal. Desirably, the spacer element results in space between said panes of from about 0.1 to about 1 inch, more desirably from about 0.15 to about 0.75 inch, (0.25–2.54 cm; 0.38–1.91 cm). Desirably, the overall thickness (not counting undulations or as measured before it is undulated) of the spacer element is about one tenth or less, more desirably one-one hundredth or less, and preferably, one-one thousandth or less of said width. For example, metal spacer elements may desirably be 0.001 to 0.01 inches thick while plastic spacers are more desirably 0.015 inches thick or more. With metal spacer elements (having higher thermal transmission rates than most polymers) it is desirable to keep their cross-section for thermal transmission small.

The first and second transparent or translucent panel members are desirably glass or plastic sheets for use in windows. They can also be called glazing sheets. Glass, if preferred for its low moisture vapor transmission rate (MVT) allowing the inner gas space to retain a low dew point for a longer service life. The unitary seal can also be used with panels that do not transmit light. Although two panel members (panes) are the minimum to define a sealed insulating gas space, additional panels and/or other materials may be present to result in two or more insulating gas spaces. Desirably, the panel members are facing each other and parallel and the same size and shape.

Glass members include simple glass, coated glass sheets, tempered glass, and low emissivity (E) glass, which has been treated on one or more surfaces with various metal oxides. Typical coatings for E glass include layers of iridium oxide and/or elemental silver and optionally layers of zinc oxide and/or titanium oxide. Generally, glass thicknesses vary from about 0.080 to about 0.25 inches (about 0.20 to about 0.64 cm), although the glass can be thinner or thicker for specific applications. Polymer (plastic) sheets due to their higher moisture vapor transmission rates and lower weight are preferably intermediate layers in insulated windows with three or more members. These multiple panel windows may have seals between all panel members or may have panels positioned between two other panel members which are joined by a single seal. Panels may have mirrored, reflective, or tinted layers on one or more surfaces or an internal tint.

Between the transparent or translucent panel members there is a space defined by the panels and the seal, the seal is desirably as close to the periphery of the panel members as commercially possible and physically contacting the facing surfaces of said members. Although a vacuum in the space would provide superior insulation, usually an insulating gas such as air, argon, sulfur hexafluoride or combinations thereof is in the space. It is desirable that the space between the panels be low in moisture so that the dew point of the gas in the inner gas space is less than −30° F., more desirably less than −60° F., (less than −34° C., and less than −51° C.). The gas space being considerably less thermally conductive than glass or metal provides thermal insulation.

The ability to pass temperature cycling tests such as CAN/CGSB-12.8 -M90§4.3.4 and §4.3.5 is indicative that the seal integrity will be maintained for years in a window assembly. In these tests and in actual use, sufficient pressure above and below one atmosphere to bow the glass panes is produced by heating or cooling the insulated glass units. To demonstrate the need for compositionally different core material and adhesive film, two unitary strips with undulating aluminum spacers were prepared where the first was only a desirable core material (i.e., low in volatiles to pass §4.3.3) and the second used in addition to the core material a compositionally different adhesive film. Both were tested in temperature cycling tests where the insulated glass units were immersed in water so failure of the seal was indicated by water internally. The unitary seal without an adhesive film failed in 10–15 cycles, while the nearly identical seal with an adhesive film survived at least 1.25, 1.5, 1.75, 2.0, 3.0, 4.0, 5.0, 7.5, or 10 times as may cycles without seal failure.

The modulus of both the core material and the adhesive film are important to the durability of the assembled insulated glass unit. A higher modulus in the core material than in the adhesive film would impart the necessary stiffness perpendicular to the glass surfaces further reinforcing the spacer element(s). Alternatively, a lower modulus in the core material with respect to the adhesive film would make the system more flexible which will increase the damping characteristics and further reduce the stress concentration at the glass-film interface compared to a higher modulus core with the same adhesive layer. The difference between the moduli of the adhesive film and the core material desirably is 10 percent or more with either being higher depending on the embodiment. The moduli for this characterization are by dynamic mechanical analysis at 40° C. or higher. If multiple core material or adhesive film(s) are present, all moduli in the core material must vary from all moduli in the adhesive film by the minimal value specified.

The unitary seal has utility in forming insulating panel members for residential, commercial, and industrial construction. Often, the multiple panel members and intervening at least one sealant strip are assembled in at a central location and shipped (either as is or inserted in the sash) to where they will be installed. With the unitary sealant of this disclosure, a multiple panel member insulating structure could be assembled or modified (such as where one or more panels are replaced) at the installation site.

Figure 10:
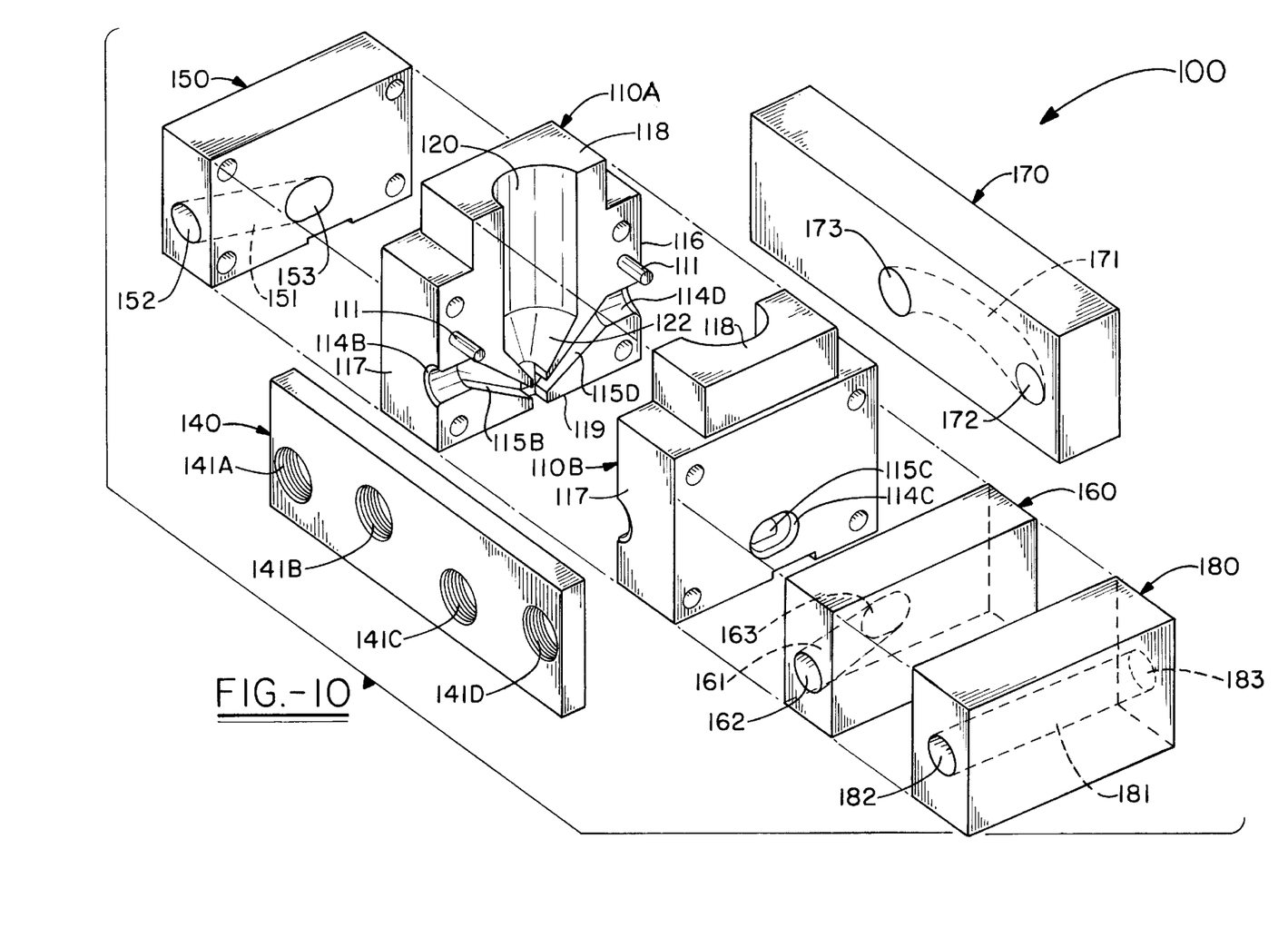
FIG. 10 is a fragmented perspective view of a multi-cavity extrusion die assembly according to the present invention.

The die utilized to make the preformed flexible laminate or unitary spacer-sealant strip of the present invention is shown in FIG. 10. A multi-cavity integral (split) extrusion die generally indicated by the number 100 has a left die half 110A and a right die half 110B which matingly engage each other as through the use of mating pins 111 and matching recesses, not shown, located in the remaining die half. Die halves 110A and 110B contain various cavities to allow a core material feed stream to partially or totally embed an undulating spacer element 210 as well as to apply one or more polymeric feed streams to coat preselected surfaces of the core material as discussed hereinbelow in greater detail. The multi-cavity extrusion die includes a bottom multi-port distribution block 140, a left side feed block 150, and a right side feed block 160, all of which can be attached and/or fastened to the die halves in any conventional manner as through the utilization of bolts and threaded recesses. A top feed block 170 is also provided in association with right auxiliary feed block 180 to permit a separate polymeric feed stream to be applied therethrough to a preselected surface of the core material.

The multi-cavity extrusion die of the present invention has one or more cavities for feeding the polymeric material to coat or form a film on a specific area or surface of the core material containing a spacer element embedded therein or thereon. That is, integral (split) extrusion die 110 formed by joinder die halves 110A and 110B has at least one feed cavity therein for applying at least one different material than the core material to a preselected surface of the formed core material within the integral or single extrusion die. Thus, the single, multi-cavity extrusion die of the present invention is not connected to and thus is free of any second extrusion die, and is free of any add on coating block, etc., which applies at least a second different material to the core material.

In a preferred embodiment as shown in FIG. 10, the extrusion die has four polymeric feed cavities. The polymeric material for each feed cavity of the multi-cavity extrusion die can be the same, or each can be different, or two or more of the feed cavities can contain the same polymer material, and so forth. In the preferred embodiment, each feed cavity contains the same polymeric material. The cavities can each be the same size or shape, or each can be different or two or more of the cavities can have the same size or the shape, and the like. Preferably, the size and shape of each cavity is the same as is the cavity angle with respect to the longitudinal extrusion die axis. Moreover, the outlet or terminus location of each feed cavity, that is, the cavity opening to the extrudate area, can be located at the same point downstream from the core cavity, or each can be located at a different distance downstream, or two or more of the outlet locations can be located at the same downstream distance, and the like. Preferably, the outlet location of each of the polymeric feed cavities is located the same distance downstream from the core cavity to avoid the spacer element from being contorted, bent, flattened, etc. Still further, the outward distance of the various two or more cavity outlets with respect to the extruded core material can each be different, or preferably at least two are the same so that the coating thickness thereof are the same. Moreover, the cavity outlets can be located opposed to one another as in a rectangle, square, hexagon, etc., polygonal, arrangement, or two or more cavities can be oppositely aligned with one another with the remaining cavities being non-opposed with respect to each other, etc. Preferably, two of the opposed cavity outlets are opposed to one another as are the remaining two outlet cavities, all in alignment with respect to the extruded core material. The description of the feeding system will thus relate to these preferred embodiments although it is to be understood that many variations thereof such as those noted hereinabove and hereinbelow can exist.

Figure 11:
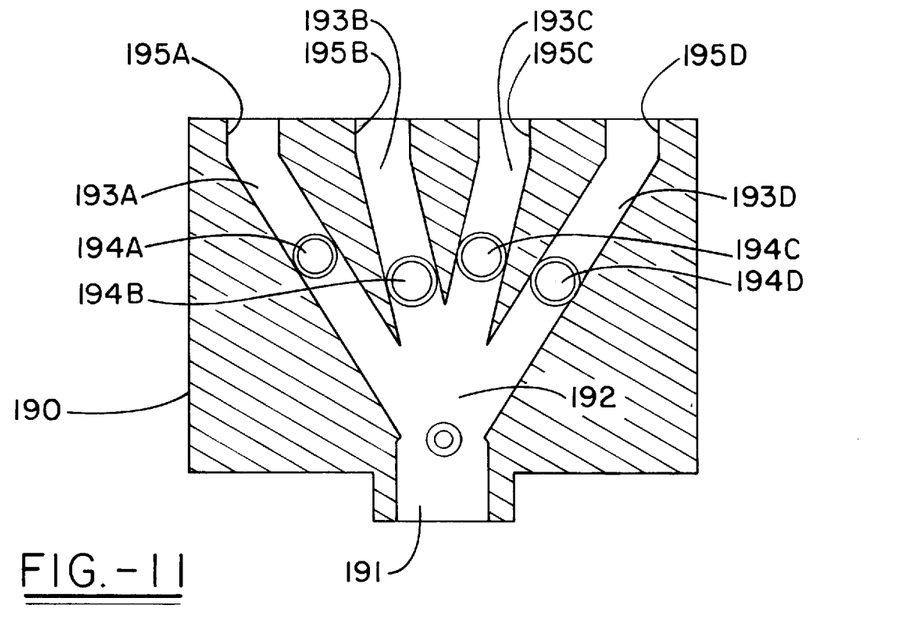
FIG. 11 is a cross-sectional view of a manifold feed block which supplies the extrusion die with a polymeric feed material.

Manifold feed block 190 which is fastened or attached to the bottom of multi-port distribution block 140, contains an entry port for receiving a desired polymeric material such as a polymeric adhesive coating as noted hereinabove. The polymeric material can be fed to the manifold feed block from any conventional supply source such as a positive displacement pump, a gear pump, an extruder, and the like. Of course, if two or more different polymer materials are utilized, two or more different supply sources should be utilized. As the polymeric material is pumped into the manifold feed block, see FIG. 11, it passes through entry port 191 and enters distribution area 192. The distribution area terminates in feed supply channels 193A, 193B, 193C, and 193D. Within each said supply channel, an optional flow control valve 194A, 194B, 194C, or 194D, respectively, can exist. Such flow control valves serve to control the amount of polymeric material applied to a specific surface of the core material, or to a surface of the spacer element if the same is exposed on a surface of the core material. The polymeric material leaves the manifold feed block through respective outlet ports 195A, 195B, 195C, and 195D, each of which is directly connected to four feed ports, i.e., 141A, 141B, 141C, and 141D, respectively, of bottom multi-port distribution block 140.

Figure 16:
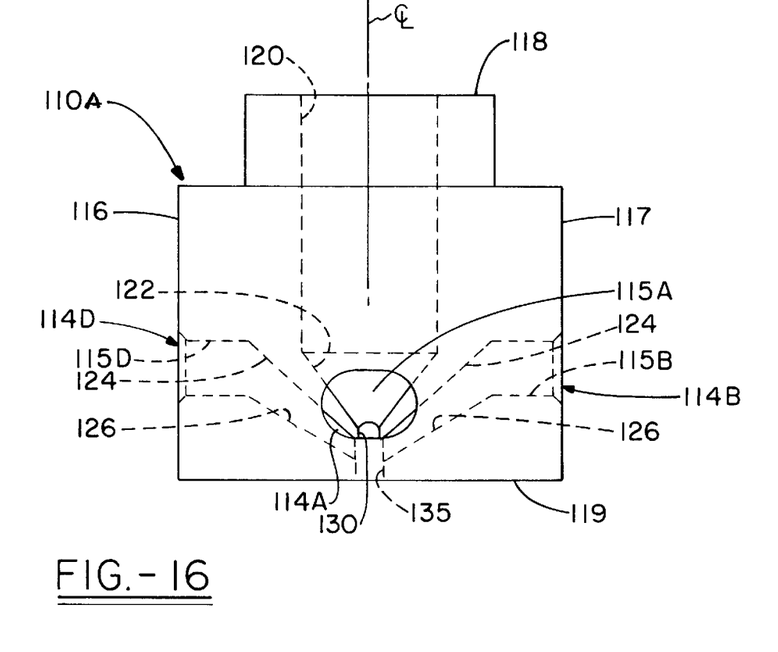
FIG. 16 is a left side external view of the left die half.

Each of the feed ports 141A, 141B, 141C, and 141D, in turn, is connected to various feed blocks as shown in FIG. 10, with each feed block in turn being connected to a specific cavity of the multi-cavity extrusion die. Thus, feed port 141A is connected to feed channel 151 of left side feed block 150. Feed channel 151 extends from entrance port 152 partially through left side feed block 150 at an angle so that the entrance to left die half 110A is greater than a 90° angle. The polymeric material leaves the left side feed block through exit port 153 which is connected to left die port 114A of left feed cavity 115A, see FIG. 16. The obtuse angle between feed channel 151 and feed cavity 115A facilitates the flow of the polymeric material as well as prevents extreme back pressure and thus an unbalanced polymer pressure and/or flow with respect to the other feed streams. Feed port 141B of distribution block 140 is directly connected to bottom port 114B of bottom feed cavity 115B. Feed port 141C of distribution block 140 is connected to right side feed block channel 161 which has entrance port 162 and exit port 163. The exit port is connected to right die port 114C of right feed cavity 115C. Feed port 141D is connected to feed channel 181 of auxiliary feed block 180 which has entrance port 182 and exit port 183. The exit port of feed channel 181 is desirably connected to feed channel 171 of top feed block 170. The top feed channel has an entrance port 172 and an exit port 173 which in turn is connected to top die port 114D of top feed cavity 115D. As with feed channel 151, feed channels 161 and 171 form an obtuse angle with their respective cavity of the extrusion die.

Referring now to the multi-cavity extrusion die, while it will be described with regard to the above-noted preferred embodiments, it is to be understood that while the thickness of each polymer film applied to the core material can independently vary, an equal thickness on at least opposed surfaces is preferred.

Figure 1:
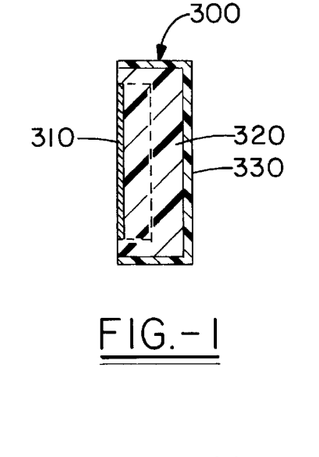
FIG. 1 FIGS. 1–5 show transverse cross-sectional views of the unitary seal (laminate).
Figure 2:
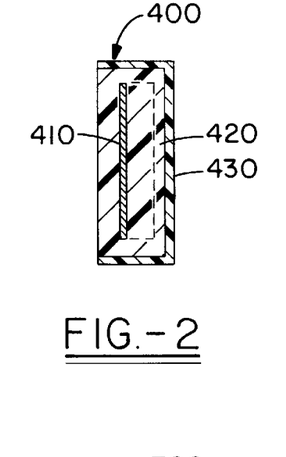
Figure 3:
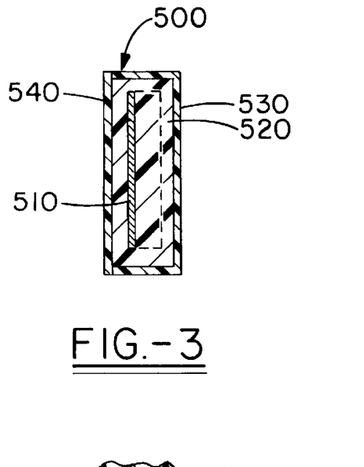
Figure 4:
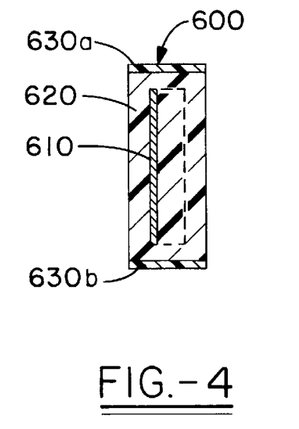
Figure 5:
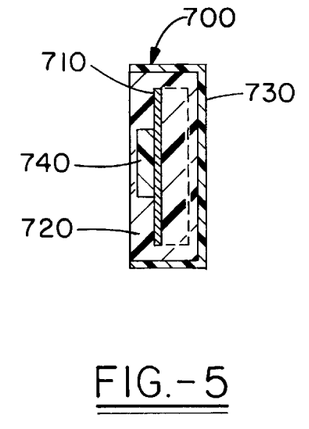
Figure 6:
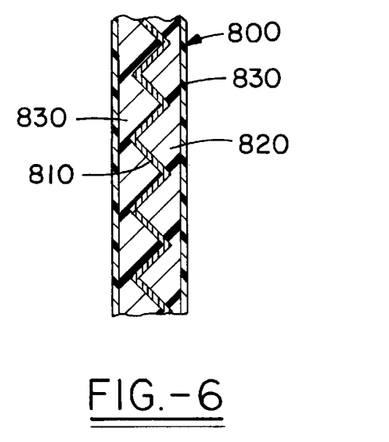
FIG. 6 is a longitudinal cross-sectional view of the seal of FIG. 3. This shows undulations in the spacer (210)
Figure 7:
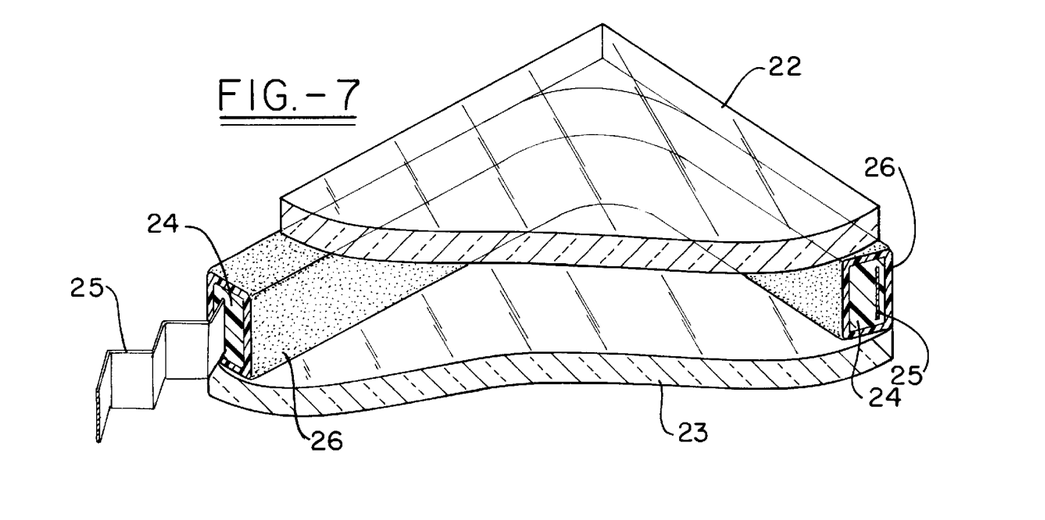
FIG. 7 is a partial perspective view of the preformed flexible laminate of the present invention wherein the laminate contains spacer element 25 embedded within core material 24 which is coated within adhesive film 26. The flexible laminate is located between two spaced apart glass sheets 22 and 23 along the peripheral edge thereof.
Figure 12:
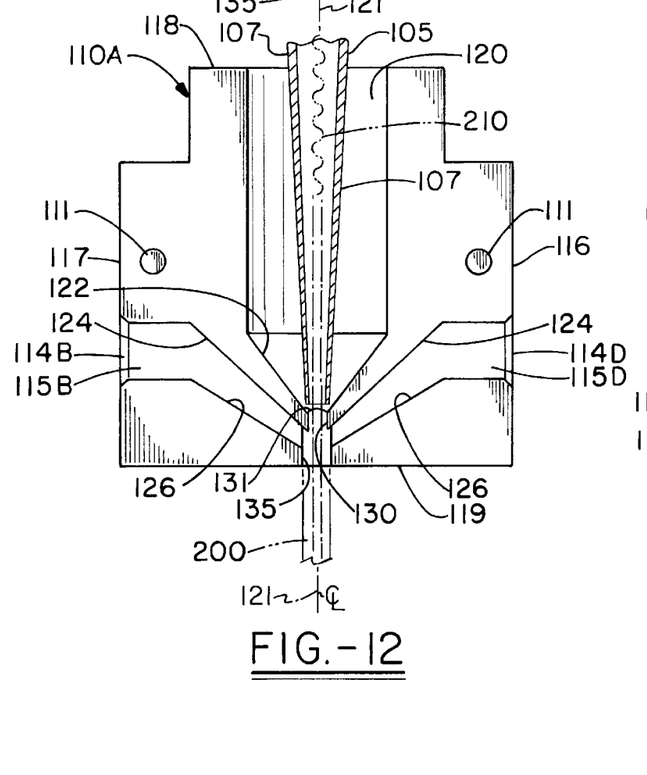
FIG. 12 is an internal side view of the left die half of the present invention.
Figure 13:
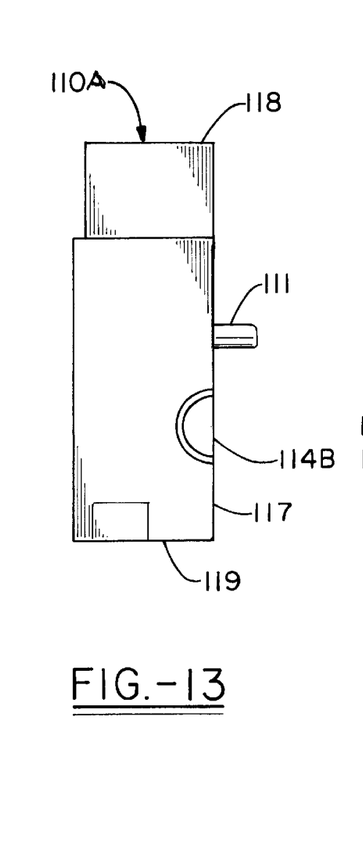
FIG. 13 is a bottom view of the left die half.
Figure 14:
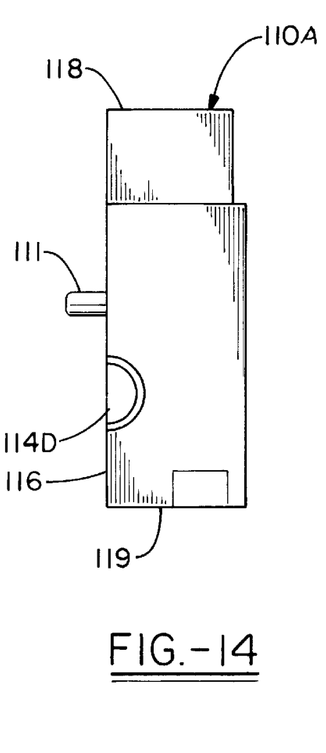
FIG. 14 is a top view of the left die half.
Figure 15:
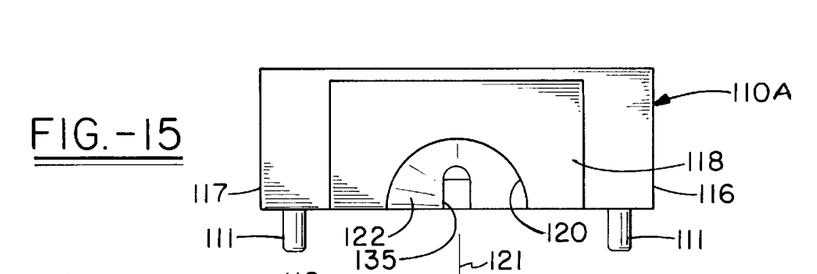
FIG. 15 is a back view of the left die half.

The multi-cavity extrusion die as seen in FIG. 12 has a core cavity 120 which is generally cylindrical and contains spacer element 210 therein. Generally positioned within core cavity 120 is a guide chute 105 having converging walls 107 which generally terminate within the lower portion, i.e., the converging wall portion of the core cavity. Preferably, the location of the chute end is just before (i.e., longitudinally above) the inner land, e.g., about $\frac{1}{16}$ inch. The guide chute can be positioned via support elements, not shown, such that the spacer element can be centrally located within the core material such as shown in FIGS. 2 or 3, or on one face thereof as shown in FIG. 1, or the like. That is, based upon an X-Y axis grid work, the spacer element can generally be located at any portion thereof.

The core cavity terminates with converging, conical wall 122 having a desired angle with respect to the longitudinal axis of the die, i.e., the core cavity center line or front-back axis 121. The convergence or approach angle is very important inasmuch as if it is too small, the pressure of the core material being pumped or transferred through the core cavity will deform or generally flatten undulating spacer element 210. On the other hand, if the converging approach angle is too great, turbulent flow of the polymer will occur causing fold-over of the polymer and entrap air from the bottom of guide chute 105 along the core coated spacer element. Suitable convergence angles from center line 121 to converging wall 122 range from about 30 to about 60, desirably from about 35 to about 50, and preferably from about 37 to about 45 degrees. During operation of the multi-cavity extrusion die, as the spacer element is drawn through the core cavity filled with core material, the core material is applied generally to both faces of the typically rectangular element as well as to both edges thereof.

Located immediately downstream from the core cavity inner lands 130 are the various polymeric feed cavities (see FIGS. 10, 12, 16, 18, and 19), each of which has an interior wall 124 located towards the backside 118 of the extrusion die and an exterior wall 126 located towards the front side 119 of the die. The angle of the interior wall with respect to the longitudinal die axis (i.e., centerline) 121 is generally greater than the core convergence angle and is generally from about 50° to about 65° with from about 55° to about 65° being preferred, whereas the exterior wall angle with respect to the die axis can generally vary from about 65° to about 85° with from about 78° to about 83° being preferred. These angles are generally important to allow an equal coating thickness to be applied across the entire width of the one or more surfaces being coated as well as to achieve similar or equal pressures and/or a balanced or equal flow of the polymeric coating.

Figures 17, 18:
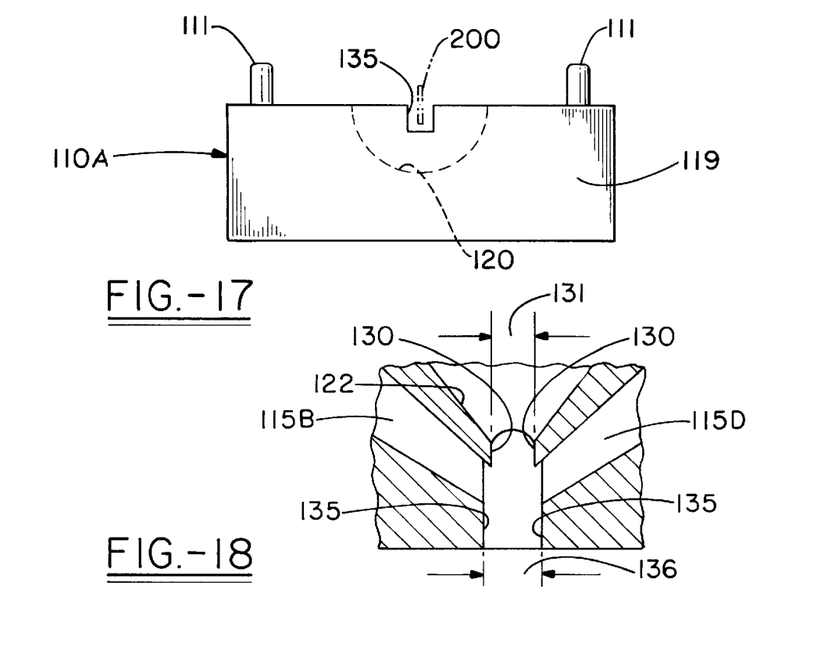
FIG. 17 is a front view of a left die half.
FIG. 18 is an exploded view of a multi-cavity extrusion die land and aperture areas.

As especially shown in FIG. 18, opposed and substantially parallel inner land surfaces 130 (i.e., generally less than b 10degrees, desirably less than 5 degrees, and preferably about 0 degrees, i.e., parallel with respect to one another) are located between the terminal or outlet portion of the polymeric feed cavities and the end of core converging wall 122. The longitudinal length of the inner land surfaces, i.e., the distance in the longitudinal direction or die axis is important inasmuch as if the length is too long, too much pressure is applied to the spacer element which causes the lateral undulations, projections, etc., to be distorted, reduced in size, or flatten, etc. On the other hand, if the length is too short, the core material applied to the spacer element upon egressing from inner lands 130 would expand so that instead of forming a preferred rectangular shape core having the spacer element embedded therein, the sides thereof would balloon and be arcual, bowed, etc. A suitable inner land length is generally from about 3/32 to about 1/2, desirably from about 1/8 to about 7/16, and preferably from about 3/16 to about 1/4 inches.

Figure 8:
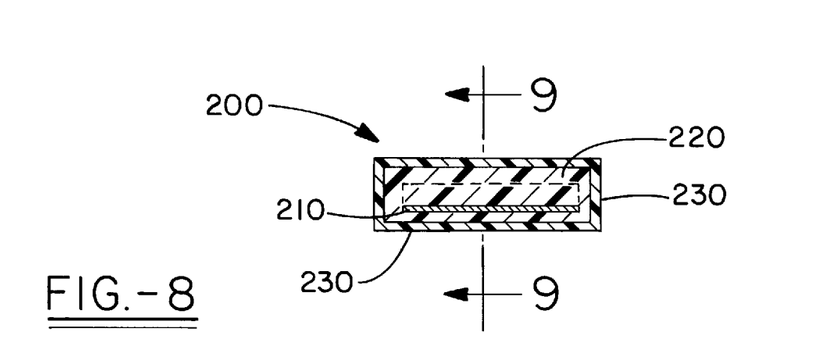
FIG. 8 is a transverse cross-sectional end view of a preferred flexible laminate.
Figure 9:
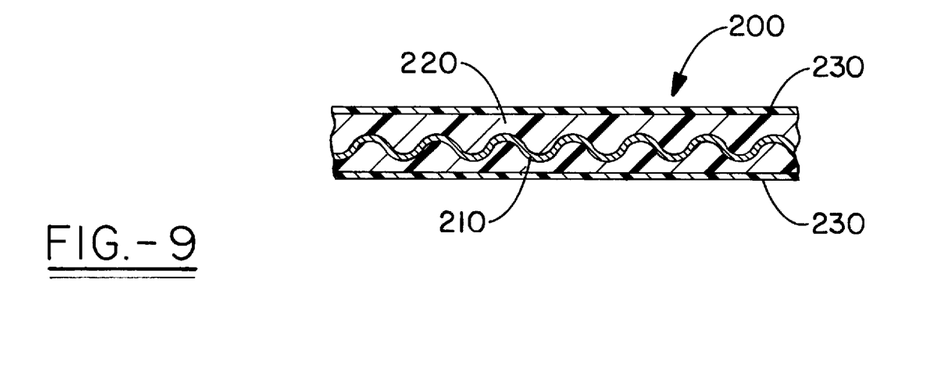
FIG. 9 is a longitudinal cross-sectional side view of a preferred flexible laminate.

Sequentially, or after the spacer element passes through core extrusion aperture 131 (i.e., downstream therefrom) a polymeric coating or film is applied thereto by the one or more, preferably four, polymer feed cavities, the terminal or outlet portion thereof is located between inner lands 130 and outer lands 135. In the preferred embodiment of the invention, the pressure and/or flow of the polymeric coating material in cavities 115A and 115C are desirably equal so that the two edges of the preferred rectangularly extruded core material containing a spacer element embedded therein are of equal thickness, see FIG. 8. The thickness of the coating on the faces (sides) of the core material are also desirably of the same thickness although this thickness may be different from the edge thickness. The flow rate of the polymer coating can be controlled by the pressure at which it is fed through the feed cavities, by the temperature thereof, or both. For example, as the temperature of the coating material is increased, less pressure is required to force the same through the feed cavities. Alternatively, lower temperatures generally require increased pressure. Generally, the viscosities of the polymeric material of each feed cavity is within 20 percent, desirably within 10 percent, and preferably within 5 percent of each other.

It is generally important that the flow pressure through the various two or more cavities be generally equalized since otherwise a greater pressure or force through any one cavity would tend to deposit more coating on that particular surface and reduce the amount of coating applied to the opposite surface. To help insure that the pressures are the same, the various feed cavities can optionally contain a flow splitter, i.e., a piece of metal (not shown) which generally extends across the feed cavity aperture (desirably the top and bottom cavities 115D and 115B) and insures that equal amounts of polymer coating are channeled through the entire cross section of the cavity opening.

After the various polymeric coatings are applied to the extruded core material spacer element via the polymer feed cavities, it is subsequently shaped by downstream coating extrusion aperture 136 located between opposed and substantially parallel outer land surfaces 135 (i.e., generally less than 10 degrees, desirably less than 5 degrees, and preferably about 0 degrees, that is parallel, with respect to each other). Generally, the shape of coating extrusion aperture 136 is the same shape as the extruded core material spacer element but has a slightly larger width and height to allow for the thickness of the edge and face coatings, i.e., preferably an equal thickness for the opposed surfaces but with the proviso that the face thickness can be different than the edge thickness. As apparent from FIG. 18, the outer lands are located immediately downstream from the outlet of the polymer feed cavities. As with the inner land surface length, the outer land surface length is also important inasmuch as if it is too short, the various coating materials can swell or enlarge generally forming an arcual or bowed coating on a surface where if it is too long, excessive pressure build-up occurs which can distort the desired spacer element projections or undulations as by flattening the same.

Although FIG. 17 shows the relationships of the inner and outer lands between feed cavities 115B and 115D, while not shown, it is to be understood that the relationship of any remaining lands, e.g., inner and outer lands between the left and right feed cavities 115A and 115C are similar. For example, the inner lands exist the same distance downstream from the core cavity, have the same land length, and can be set back the same distance from the extruded core material so that each edge thickness of the polymer seal is equal. The same is true with regard to the relationships of the outer lands. Moreover, the length of the outer land (i.e., longitudinal distance) is generally the same as the inner land.

Figure 19:
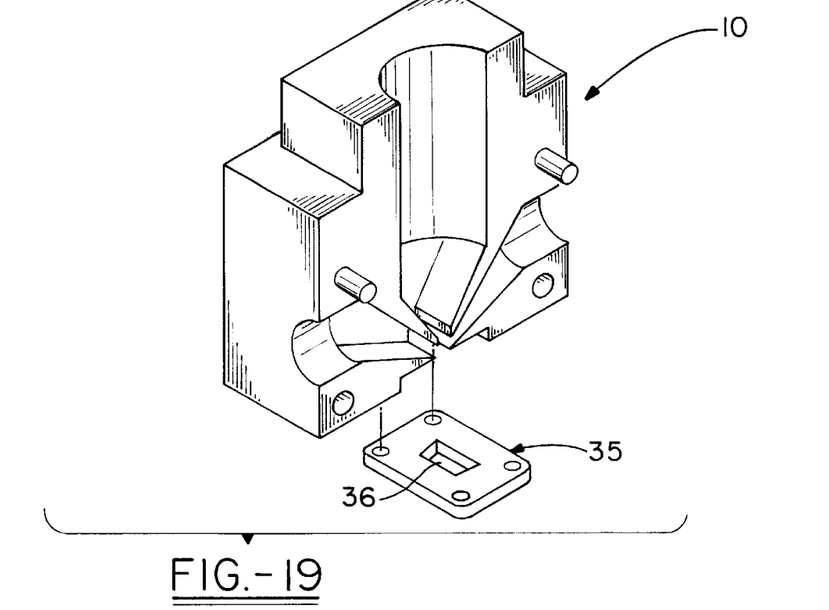
FIG. 19 is a perspective view of an alternative embodiment of an extrusion die having an outer land insert.

An alternative embodiment of the multi-cavity extrusion die of the present is shown in FIG. 19. FIG. 19 discloses a left die half as well as a right die half wherein generally only the front portion of the die has been modified so that no outer integral land exists. That is, the longitudinal axis of the multi-cavity extrusion die terminates at the terminus of the polymer cavity exterior wall. Inasmuch as the remaining aspects of the multi-cavity extrusion die as well as the various feed blocks, for example, the bottom distribution block, left side block feed block, the right side feed block, etc., are essentially the same, they have not been shown. As is shown in FIG. 19, the core cavity and core convergent wall angles, the various polymer feed cavities and convergent angles, generally equalized flow rates and/or pressure, and the like, are all generally the same as noted hereinabove and hence will not be discussed. The same is true with regard to the inner land length and aperture thereof. As with the multi-cavity extrusion die embodiment shown in FIGS. 10 through 18, the various aspects of the outer land insert are the same as above described integral outer land with regard to generally the outer land length, the aperture thereof, and the like, and thus will not be repeated but rather hereby fully incorporated by reference.

The advantage of utilizing multiple cavity extrusion die 10 having an outer land insert 35 is that only one or a couple of the multiple cavity extrusion dies are required (each having numerous, relatively inexpensive land inserts 35) as opposed to otherwise numerous and costly extrusion dies.

Multiple cavity extrusion die 10 extrudes core material generally about a spacer element as noted above. Numerous different embodiments with regard to the outer land insert can exist. For example, the width of different spacer elements 31 can vary, e.g., as shown in FIGS. 20A, 20B, and 20C, but the outer land aperture 36 is the same. Thus, the edge thickness of the polymeric material on the edge of the spacer element is thicker in FIG. 20A than that shown in FIG. 20B, which in turn is thicker than that shown in FIG. 20C. In all figures, 20A, 20B, and 20C, the height of the land aperture is the same and thus the thickness of the polymer coating on the face of the core material are all the same. Alternatively, the width of the spacer element can be the same as shown in FIGS. 21A, 21B, and 21C, but the land aperture width 36 varies. Thus, the edge polymer coating of FIG. 21A has a large thickness on both edges of the spacer element, whereas the edge thickness of the polymer coating in FIG. 21B is less, and in turn the edge thickness of the polymer coating in FIG. 21C is still even less. In each of the three embodiments of FIGS. 21A, 21B, and 21C, the height of length of the land is the same and thus the thickness of the face coating on the core are all the same.

Figure 20:
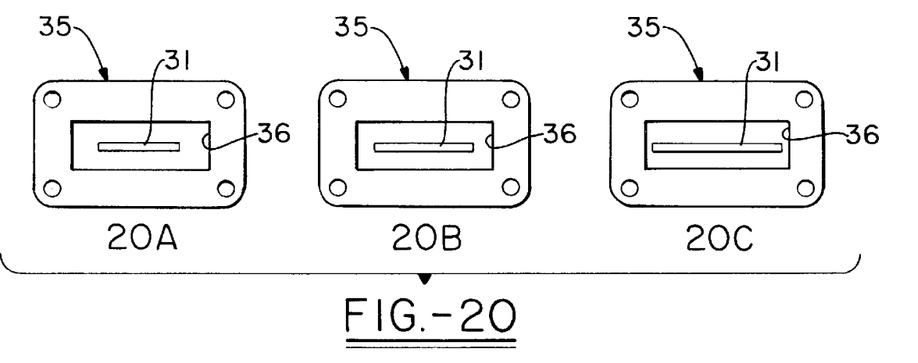
Figure 21:
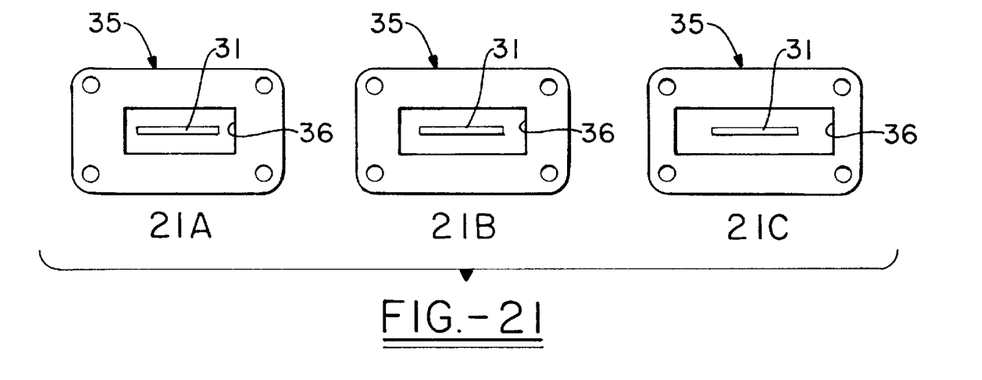

As apparent from the outer land insert embodiment of FIGS. 19, 20 and 21, numerous spacer elements can be coated with a core material and subsequently coated with a polymer coating wherein the width of different spacer elements can vary, the height of different spacer elements can vary, the thickness of different spacer element polymer edge coatings can vary, or the thickness of different polymeric face coatings can vary, or any combination thereof. Moreover, the outer land length can vary from insert to insert. Utilization of the outer land insert thus greatly extends the capability or use of a single or individual multiple-cavity extrusion die having no outer land as an integral part thereof.

A spacer element embedded within a core material and a polymer coating as shown in FIGS. 1–9 can be formed in the following manner. A suitable core material is added to core cavity 120. The core material can be extruded through the cavity utilizing any conventional extrusion means. A suitable spacer element which can have an undulating, zigzag, etc., shape is selectively located by chute guide 105 and fed through the central portion of the core cavity and through inner land aperture 131. Subsequently, sequentially, or downstream thereto, the polymer coating is added or applied to one or more preselected surfaces or areas, for example, opposed edges of the extruded core material, at a suitable and desirably equal thickness as well as on the faces of the extruded core material. The polymeric material is then extruded through the outer land aperture. The outer land can be an integral part of the multi-cavity extrusion die as in FIGS. 10–18, or an outer land insert fastened to a modified extrusion die as in FIG. 19. The temperature of the core material is such to generally soften the same and an appropriate pressure is utilized or applied to cause it to flow through the inner land, for example, by cold flow. Similarly, the temperature and pressure of the polymer coating are such that the polymer coating material is softened and the pressure is sufficient to apply it to the core material and to flow through the outer land aperture. The specific temperature and pressure utilized will naturally vary depending upon the type of core materials or one or more polymeric materials utilized. Appropriate temperatures can thus widely vary as from about 100° F. (38° C.) to about 600° F. (316° C.) and more desirably from about 175° F. (79 ° C.) to about 250° F. (121° C.). Appropriate pressures as for the polymer coating can also vary widely as from about 50 to about 2,000 or 3,000, and more desirably from about 500 to 1,000 psi.

In summary, the preformed flexible laminate 200 of the present invention is thus formed by a sequential coating step, i.e., generally the initial formation of a core material about a spacer element and subsequently the application of the polymer coating to one or more preselected surfaces of the formed core. The preselected surfaces of the core are in different planes with respect to the longitudinal axis of the core. That is, when two or more coating cavities are utilized, they coat surfaces which are generally not portions of the same longitudinal plane or surface but can be opposed (i.e., parallel) surfaces such as those which exist in a square, rectangle, hexagon, and octagon, etc., or surfaces which are acute or oblique to one another. Only a single extruder is required to form the flexible laminate. Moreover, as set forth in FIG. 11, only one manifold feed block need be utilized to supply a plurality of feed streams feeding the two or more cavities of the multi-cavity extrusion die with generally equal flow pressures and/or flow. The entire process is conducted in such a manner due generally to such parameters as suitable core convergent angles, suitable polymeric coating application angles, suitable land lengths, and the like so that the shape of the undulating spacer element is substantially and preferably not affected, deformed, or altered.

While in accordance with the Patent Statutes, the best mode and preferred embodiment has been set forth, the scope of the invention is not limited thereto, but rather by the scope of the attached claims.

What is claimed is:

1. A composite structure comprising;
    at least a first and second transparent or translucent panel members having facing, generally parallel surfaces spaced a generally finite distance apart from each other and a unitary seal located generally along the peripheries of said first and second members, in physical contact with the facing surfaces of said members, said unitary seal comprising
    a) at least one longitudinal core material
    b) at least one longitudinal adhesive film in physical contact with said core material and adhering said core material to said first and second members; and
    c) at least one longitudinal spacer element substantially perpendicular to the planes formed by said first and second members and having a width, measured perpendicular to said panel members, of less than or equal to said finite distance, said at least one spacing element being bendable perpendicular to its width to an angle from 2° to 150° without changing said width of said spacer element more than one tenth of one percent, said at least one spacing element extending substantially along the length of said unitary seal, and said at least one spacer element adhered to, partially embedded in, or embedded in said at least one longitudinal core material, said adhesive film of said unitary seal being compositionally different than the composition of said at least one core material and at least a portion of said longitudinal core material being located between said spacer element and a gas space defined by said first and second members and said unitary seal.

2. A composite structure according to claim 1, wherein said adhesive film has greater weight percentage of tackifier resin than said at least one core material and wherein said tackifier resin has a number average molecular weight of less than 10,000.

3. A composite structure according to claim 2, wherein said adhesive film has from about 2 to about 50 weight percent of said tackifier, and said at least one core material has less than 20 weight percent of said tackifier, and said weight percent tackifier of said at least one adhesive material is at least 2 weight percent greater than in said at least one core material.

4. A composite structure according to claim 1, wherein the weight percent of desiccant in said at least one core material is greater than in said adhesive film.

5. A composite structure according to claim 4, wherein said at least one core material has from about 5 to about 50 weight percent desiccant and said at least one adhesive film has less than 12 weight percent desiccant and the weight percent of said desiccant in said at least one core material is at least 2 weight percent higher than in said adhesive film.

6. A composite structure according to claim 1, wherein the adhesive film has a greater modulus than said core material.

7. A composite structure according to claim 1, wherein the core material has a greater modulus than said adhesive film.

8. A composite structure according to claim 1, wherein said unitary seal further comprises a barrier film in direct physical contact with a space between said first and second panel members and said unitary seal and in continuous contact around inner peripheries formed from the unitary seal and said first and second panel members.

9. A composite structure according to claim 8, wherein said barrier film acts as a barrier to volatiles in said at least one or more core material from entering said sealed space.

10. A composite structure according to claim 8, wherein said barrier film has less total volatile organic materials upon exposure to U.V. in CAN/0CGSB-12.8-M90 §4.3.3 than said unitary seal without said barrier film.

11. A composite structure according to claim 1, wherein said at least one adhesive film is comprised of a polymeric material having a primary Tg at least 5° C. lower than the primary Tg of said at least one core material.

12. A composite structure according to claim 1, wherein the combined thermal conductivity of said at least one core material is at least 10 percent less than the thermal conductivity of said adhesive film.

13. A composite structure according to claim 1, wherein said adhesive film is curable under conditions where the at least one core material does not cure.

14. A composite structure according to claim 11, wherein said at least one spacer element comprises metal spacer element undulating along its length.

15. A composite structure according to claim 1, wherein said at least one spacer element comprises a plastic or cellulosic or crosslinked rubber or combinations thereof.

16. A composite structure according to claim 1, wherein said at least one spacer element comprises an undulating laminate of metal with cellulosic, plastic, or a crosslinked rubber.

17. A composite structure according to claim 1, wherein said core material includes a foamed polymeric material.

18. A composite structure according to claim 1, wherein said adhesive film comprises an isobutylene based polymer.

19. A composite structure according to claim 1, wherein said at least one core material comprises an isobutylene based polymer.

20. A composite structure according to claim 18, wherein said at least one core material comprises an isobutylene based polymer.

21. A composite structure according to claim 18, wherein said spacer element comprises an undulating metal strip.

22. A composite structure according to claim 21, wherein said isobutylene based polymer is at least 20 weight percent of the polymers of said adhesive film.

23. A composite structure comprising at least a first and second transparent or translucent panel members having facing, generally parallel surfaces spaced a finite distance apart from each other and a unitary seal located generally along the peripheries of said first and second members, in physical contact with the facing surfaces of said members, said unitary seal comprising a) at least one longitudinal core material
b) at least one longitudinal adhesive film in physical contact with said core material and adhering said material to said first and second members; and
c) at least one spacer element continuous along the length of said unitary seal having its maximum rigidity substantially perpendicular to the planes formed by said first and second members said spacer element being bendable transverse to its width at an angle from 2° to 150° without changing said width of said spacer element more than one tenth of one percent and said at least one spacer element adhered to, partially embedded in, or embedded in said at least one core material, p2 said at least one adhesive film being compositionally different than the core material and increasing the cycles to failure of said unitary seal by a factor of at least 1.25 with failure as defined in CAN/CGSB-12.8 M90 §3.6.5 over a comparable unitary seal having the same spacer element and core material and wherein the adhesive film in said comparable unitary seal is identical in composition to the core material.

24. A composite structure according to claim 23, wherein said adhesive film contains a larger amount of tackifier and glass adhesion promoter on a weight percent basis than said core material.

25. A composite structure according to claim 24, wherein the factor for increasing cycles to failure over a comparable seal is at least 2.0 and wherein said adhesive film has at least 2 weight percent more tackifier and at least 0.25 weight percent more glass adhesion promoter than said core material.

26. A composite according to claim 25, wherein said adhesive film has at least 5 weight percent more tackifier and at least 0.50 weight percent more glass adhesion promoter than said core material and wherein said glass adhesion promoter is a silane compound.

* * * * *